D. C. BROWN.
CASE FOR CHEWING GUM, TICKETS, OR OTHER SIMILAR ARTICLES.
APPLICATION FILED DEC. 9, 1913.

1,131,112.  Patented Mar. 9, 1915.

WITNESSES:
J. Milton Jester
H. P. Roberts

INVENTOR
Delbert C. Brown.
BY
W. Schornbou
ATTORNEY

UNITED STATES PATENT OFFICE.

DELBERT C. BROWN, OF ACRES, KANSAS.

CASE FOR CHEWING-GUM, TICKETS, OR OTHER SIMILAR ARTICLES.

1,131,112.  Specification of Letters Patent.  Patented Mar. 9, 1915.

Application filed December 9, 1913. Serial No. 805,610.

*To all whom it may concern:*

Be it known that I, DELBERT C. BROWN, a citizen of the United States, residing at Acres, in the county of Clark and State of Kansas, have invented certain new and useful Improvements in Cases for Chewing-Gum, Tickets, or other Similar Articles, of which the following is a specification.

My invention relates to improvements in cases for receiving or storing small packages of chewing gum, the same being provided with means for ejecting a single package, as described, and while I have described the same as particularly adapted for use in connection with chewing gum, it will be readily seen that the use of said improvements is not limited to such application, as the same may be applied for storing tickets or other similar articles.

The objects of my invention are to construct a case which is of simple form, cheap to manufacture and of few parts, which may be readily assembled and adjusted, and the case charged with the chewing gum packages in the least number of operations. Furthermore, the parts of the case are so constructed and arranged that there is no possibility of any of the parts being displaced when in their operative position, or becoming lost when taken apart to be charged with the chewing gum.

Other objects and advantages of the invention will appear from the detailed description to be hereinafter given.

The invention consists of structural characteristics and relative arrangement of the elements comprising the improvements, which will be more fully described in the specification, and particularly pointed out in the appended claim.

Figure 1:
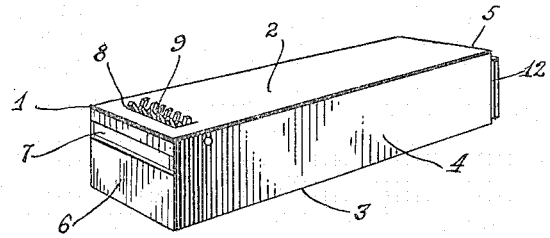
Figure 2:
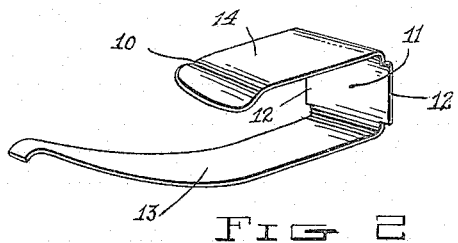
Figure 3:
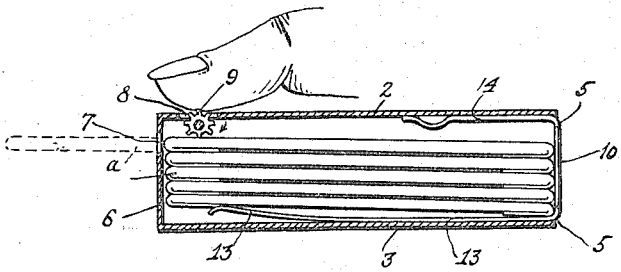
Figure 4:
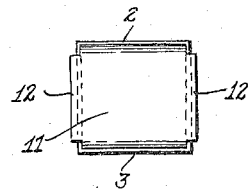

Referring to the drawings in which similar reference characters indicate the same parts in the several figures; Figure 1 is a perspective view of the case, when charged with gum; Fig. 2 is a perspective view of the combined end closure, spring, and holder of the gum within the case; Fig. 3 is a longitudinal section of the holder with the chewing gum in place; and Fig. 4 is a rear end view of the case.

Referring to the drawing, 1 is a casing of any suitable material such as metal, celluloid, wood, or the like, and is preferably rectangular in cross section, having the top 2, bottom 3, sides 4, 4, an open rear end 5, and a forward closed end 6, said end 6 being provided with a slot 7 near its top and near the upper side 2, for purposes of permitting the exit of the chewing gum packages, to be presently described.

In an opening 8 in the top 2 near the slot 7, is rotatably supported a roughened wheel or ejector 9, which is adapted to engage at one end the upper side of the uppermost chewing gum package, as shown in Fig. 3. In Fig. 2 is shown the combined gum holder and rear end closure 10, and which consists of a strip of metal such as brass or steel, which is shaped and bent up as illustrated, so as to form a rear end closure or middle section 11, having two small projecting edges 12, 12, and a lower leaf spring section 13, and an upper retaining section 14, for purposes to be presently described.

The parts being constructed as indicated, the manner of using the invention is as follows:—The packages of chewing gum as sold in the open market are arranged so as to be superimposed one upon another, and then placed in the combined holder and rear end closure 10, so that one end of the packages rests on the end of the lower spring section 13 while their other ends abut against the inner side of the rear closure, or middle section 11, as shown in Fig. 3. The combined holder and closure 10 with the packages of gum, arranged as above indicated, is then slipped with the end of the spring section 13 entering first, into the open rear end 5 of the casing 1, until the projecting edges 12, 12, abut against the rear edges of the sides 4, 4, when the spring section 13 will press the uppermost package of gum *a* into contact with the ejector or wheel 9, and the upper retaining section 14 will engage the inner side of the top 2, and firmly hold said holder 10 in the casing 1. After the casing 1 has been charged with gum as above indicated, and the parts are adjusted as shown in Fig. 3, when the ejector wheel 9 is operated, or rotated by the finger, as shown, the uppermost package of gum is thrust out through the opening or slot 7, and when entirely removed from the casing 1, the next lower package of gum is in position to be engaged by said ejector wheel 9, which operations can be repeated until the last package of gum has been removed from the casing, when the casing can be replenished with gum, as heretofore described.

The side or small projecting edges 12, 12, on the middle or rear end closure section 11, not only act as stops to hold the rear closure or end section 11 in proper relation with the rear open end 5 of casing 1, but also have the function of enabling the fingers of the operator to readily grip the projecting or outer end of the holder 10, and permit the same to be easily and quickly pulled from the inside of the casing 1.

While I have shown a rotary wheel 9 for ejecting the packages of gum from the casing, it will be readily seen that any other form of ejector common in this class of devices could be readily substituted without departing from my invention. It will also be seen that in having the spring, package holder and retaining device for said holder in the casing all in one single piece, that not only does one operation effect the charging of the holder, but at the same time, the resiliency of the spring can be easily examined and regulated or adjusted, and there is no danger of any of the parts being misplaced or lost.

What I claim is:—

A chewing gum holder comprising a casing having sides, a bottom, a top, an open rear end and a slotted forward end, an ejecting mechanism secured to the top near the slotted end and adapted to force a package of gum through the slotted forward end, a combined gum retainer and closure for the open rear end having integrally connected therewith and formed of a single piece of material an upper section adapted to frictionally engage the inner side of the top and a spring adapted to rest within and against the bottom of the casing to support and force the packages of gum in said casing toward the ejecting mechanism.

In testimony whereof I affix my signature in presence of two witnesses.

DELBERT C. BROWN.

Witnesses:
SUSIE HOLADAY,
E. H. McKOWN.

Copies of this patent may be obtained for five cents each, by addressing the "Commissioner of Patents Washington, D. C."